April 24, 1962

W. E. PERKINS 3,031,364

METHODS OF MAKING EXTRA-LARGE SIZED
FLAT AND ENDLESS RUBBER BELTS

Filed Dec. 11, 1958

INVENTOR.
WILDER E. PERKINS

BY James K. Franklin

ATTORNEYS.

April 24, 1962 W. E. PERKINS 3,031,364
METHODS OF MAKING EXTRA-LARGE SIZED
FLAT AND ENDLESS RUBBER BELTS
Filed Dec. 11, 1958 2 Sheets-Sheet 2

INVENTOR.
WILDER E. PERKINS
ATTORNEYS

United States Patent Office
3,031,364
Patented Apr. 24, 1962

3,031,364
METHODS OF MAKING EXTRA-LARGE SIZED
FLAT AND ENDLESS RUBBER BELTS
Wilder E. Perkins, Nutley, N.J., assignor to Raybestos-Manhattan, Inc., Passaic, N.J., a corporation of New Jersey
Filed Dec. 11, 1958, Ser. No. 779,782
4 Claims. (Cl. 156—137)

The present invention relates to a method of making rubber belts of extra-large lengths and widths.

One of the conventional methods of making rubber belts involves the step of press curing. Press cured belts can be made of any desired length up to several hundred feet, but the width of the belt is limited by the width of the press. Such belts can be vulcanized in endless form or can be made endless by securing the ends of a belt by means of fasteners. Most presses are less than 12 feet wide, and, therefore if a belt is required of a greater width, another method must be used.

A conventional method of making rubber belts of large widths involves the use of a mandrel and the step of vulcanization in an autoclave type of heater, using steam, hot air or water cures, depending on the type of material used in producing the belt. The lengths of such belts, however, are limited by the mandrel diameters, which in turn are limited by the size of the vulcanizer and by handling difficulties. Common vulcanizers for large width belts are usually less than 10 feet in diameter, although some vulcanizers in the industry are larger. In the process for making stretchable paper, as well as in paper making machines, endless belts are normally required having a circumferential length of 25 feet and a face width of about 20 feet. Such belts have been made on a large stainless steel mandrel that weighs about 18 tons and have then been vulcanized in an autoclave type of vulcanizer in the conventional manner, then ground to accurate thickness on the mandrel and thereafter stripped from the mandrel and suitably boxed for shipment. To make larger size endless belts such as 40 feet in circumferential length and 40 feet wide, vulcanizers have been built as large as 15 feet in diameter by 45 feet deep, accommodating mandrels about 13 feet in diameter. A mandrel of this dimension weighs in the vicinity of 30 to 40 tons and is very difficult to handle due to its massive size and weight; and to produce a belt on such a mandrel and such a vulcanizer requires very large building stands and stripping facilities.

In the process for making stretchable paper, it has become desirable to use endless rubber belts of circumferential length and width dimensions exceeding the capabilities of the referred to conventional belt making methods. Where such process for making stretchable paper is applied to the widest known machines, which produce paper sheets of about 28 feet in width, to get equal shrinkage of the paper in both directions, the belts used have to have a circumferential length much larger than 25 feet and of a length even as great as 75 feet and of a commensurate width suitable for such widest known machines. Belts of this length and width exceed the size of any known vulcanizer in existence. The larger vulcanizers and accompanying mandrel and equipment that would be required would have to be built at a very high cost, and the difficulty of handling the mandrel and the problems in manufacture of the belt on a mandrel of the required dimensions and weight would become nearly insurmountable.

The prime object of my present invention relates to a method of making belts of extra-large dimensions such as the combined extreme lengths and widths referred to and to do so by means of existing equipment such as conventionally sized mandrels and vulcanizers.

To the accomplishment of this object and such other objects as may hereinafter appear, my invention relates to the method of making extra-large belts, as sought to be defined in the appended claims taken together with the following specification thereof and the accompanying drawings in which:

The essential first steps in the method of making extra-large sized rubber belts embodying the present invention, comprises first building up a belt carcass of large length and width and of commensurate thickness, winding the belt carcass over its full width in a plurality of convolutions about a mandrel, so constructing the leading end and the trailing end of the belt carcass so as to inhibit any distortion or permanent set from occurring in the subsequent vulcanizing step, then enveloping the thus wound belt with a pressure-wrap and then placing the assembly thus produced in a vulcanizer and vulcanizing the belt. Thereafter the vulcanized belt, after removal from the mandrel, is further operated upon by assembling and grinding operations to produce either flat or endless belts of desired surface smoothness and size.

The belt carcass is first built up using conventional conveyor belt building techniques. The belt may be built up on a suitable table or floor, the various pieces of calendered rubber being laid out first, the edges being skived and securely stitched down to finish as a rectangular sheet of proper dimension to form the inside or back cover of the belt to be produced. Next, one ply of fabric, which has been previously calendered (frictioned and or skimmed) is applied to the rubber. Several lengths of this must be applied with the edges butted to produce a single ply the full width of the belt being built. Succeeding plies are then added, staggering the seams, all seams being butted, with no gaps and no laps. For the fabric, cotton, nylon, rayon, Dacron (a polyester fiber manufactured by E. I. du Pont de Nemours & Co.), or various combinations of these materials may be used. If a breaker strip is used, the breaker material is applied in a similar manner and finally the top rubber cover or gum is applied. Again, the edges of each strip must be skived, cemented and securely knitted down, using conventional conveyor belt building techniques. It is preferred practice to apply a rubber capping strip to the edges of the belt and also to cap the ends with rubber to prevent moisture from getting into the fabric during vulcanization. The resulting belt carcass, built up to a thickness of from ¾" to 1" may have a width of, for example 30 feet and a length of, for example, from 60 feet to 100 feet, depending upon the size of the mandrel and the vulcanizer.

Figure 1:
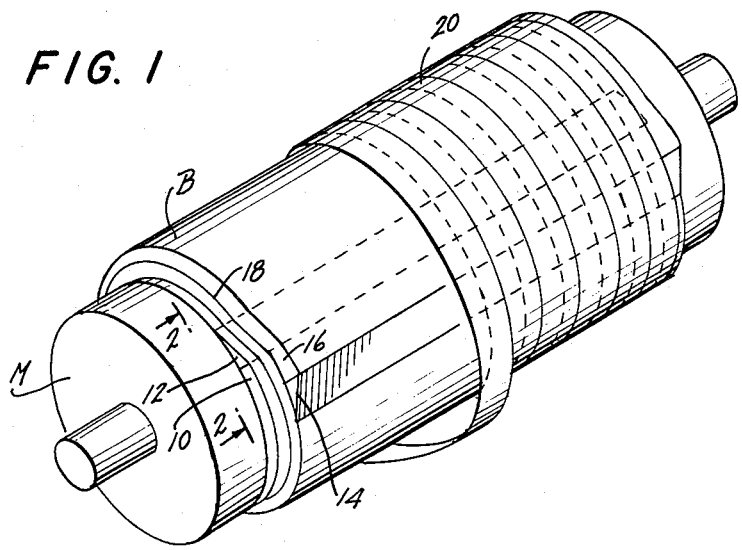
FIG. 1 is a perspective view depicting one of the first steps of the method of the present invention.
Figure 2:
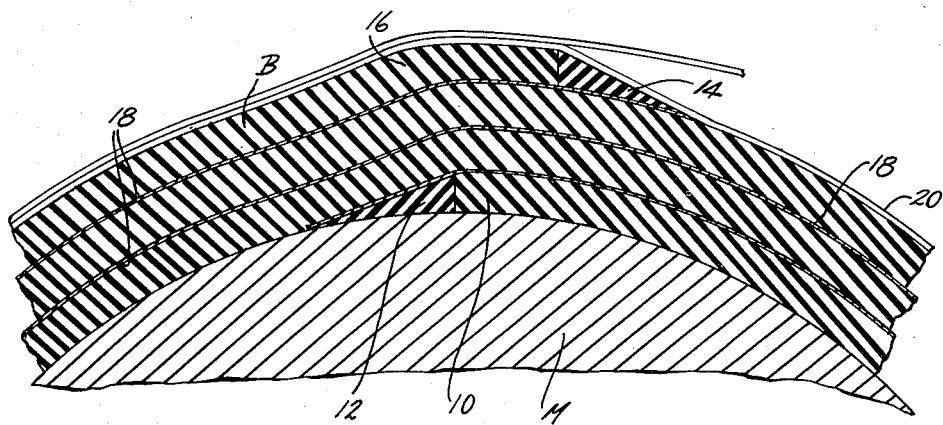
FIG. 2 is a fragmentary view shown on an enlarged scale and taken in cross-section in the plane of the line 2—2 of FIG. 1.

FIGS. 1 and 2 of the drawings depict the succeeding steps of the method. The built up belt carcass, generally designated as B, is wound in a plurality of convolutions, three such convolutions being shown in the drawings, about the mandrel M, the leading end 10 of the belt being brought up and cemented to the mandrel. To inhibit any distortion or permanent set which may otherwise occur in the vulcanization step, I provide a ramp member 12, in the form of an elongated wedge which is cemented to the mandrel transversely of the width of mandrel and which rises to the height of the belt thickness, abutting the leading end of the belt carcass. If a belt of the involved thickness were to be wound on itself, in the absence of this ramp member, considerable distortion would occur in the areas over the starting or leading end of the belt in the succeeding turns or convolutions; and such distortion would take an undesirable permanent set in the vulcanizing. To overcome this difficulty, the ramp member 12 is employed, arranged as described; and with the leading end of the belt butted up against this ramp or wedge, and the latter being at its butted end of the same thickness as the unvulcanized belt, the succeeding turns are not distorted as the belt is wound upon itself. Similarly, on the last turn or convolution of the belt I provide a corresponding ramp member 14 which abuts the trailing end 16 of the belt and which leads down from the height of the belt thickness, as clearly shown in FIGS. 1 and 2 of the drawings. This ramp member or wedge at the trailing end of the belt convolutions functions so that in press-wrapping the belt in the next step of the process, pressing down the trailing end of the belt is inhibited, thus avoiding distortion of the material in the last turn, as well as in the turns underneath in the region of the trailing belt end.

The ramps 12 and 14 may be made of duck or remnant belting cured or uncured. It is of importance that the abutting side of the ramps be of a height equal to the thickness of the belt carcass ends. It is also highly desirable that these related dimensions be maintained in the vulcanizing step so as to avoid the formation of any creases in the belt at regions corresponding to the junctions of the ramps and belt ends; and to accomplish this the material of the ramps may be of uncured stock the same as that of the belt carcass so that corresponding changes in height may take place during curing in the belt carcass and in the ramps.

In the winding step, it is preferred to interpose between the convolutions a material to prevent the windings from sticking together. After the belt is built up and prior to winding the same about the mandrel, it is preferably dusted with soapstone on both sides or with other parting agents or washed with silicone. To prevent inter-turns sticking, the material interposed between the turns may comprise a suitable liner 18 (see FIG. 2) which may be made from any type of thin fabric or Mylar (a polyester film made from polyethylene terephthalate manufactured by E. I. du Pont de Nemours & Co.), or similar material. I have also found that wet soapstone, various types of soap and other mold release agents, normally used in the rubber industry, as well as a silicone solution, may be used to prevent the various turns from sticking together.

After winding the belt about the mandrel in the manner descrbed, the belt is then pressure wrapped or enclosed. This may be done by wrapping and cross wrapping the belt with either wet cotton or nylon wrappers which latter are wound helically as shown in FIGS. 1 and 2 of the drawings to produce the press-wrap 20 enveloping the wound belt carcass B under pressure. An alternate method is to envelope the belt in a suitable cocoon of butyl rubber, Mylar or similar material producing an airtight heat resistant bag or envelope for the belt, this being followed by evacuating the cocoon envelope thereby collapsing the same securely around the belt. This alternate method may be used in substitution for or in conjunction with the pressure-wrap 20.

In these steps of the method, it will thus be seen that using a mandrel of only 25 feet in circumference, it is readily possible to make a belt over 75 feet long; and if larger mandrels are used, this length could be readily increased.

The assembly thus produced is then transported to the vulcanizer and the belt is vulcanized. When using the pressure-wrap 20 the assembly is vulanized in the conventional manner, using hot air, steam or water, depending on the methods used in curing the particular material of the belt. When using the envelope pressure-wrap, the assembly is vulcanized or cured in a conventional manner using pressurized hot water, steam or pressurized air. To secure uniform curing, the belt layers should preferably not be more than 4″ or 5″ thick, this is to avoid the over-curing of the outside turns of the belt before the heat can penetrate to the center of the belt. The width of the belt that can be produced in this manner is only limited by the face length of the mandrel; and this, as well as the depth of the vulcanizers, may well run to over 50 feet.

After vulcanization, the wrap 20 or its equivalent is removed and the belt is unwound from the mandrel. The belt thus produced may then be ground to smoothness and uniform thickness either to produce a flat belt or an endless belt. If accuracy of thickness is unimportant and a flat belt is desired, it is only then necessary to remove the wrapper marks on the outside surface of the belt, and this may be done by sanding off the marks using a floor or rotary disc sander. Where it is desired to smooth the surfaces of the belt and reduce the same to an accurate thickness dimension, in the making of either flat or endless belts, the belt is further processed in manners now to be described.

Figure 3:
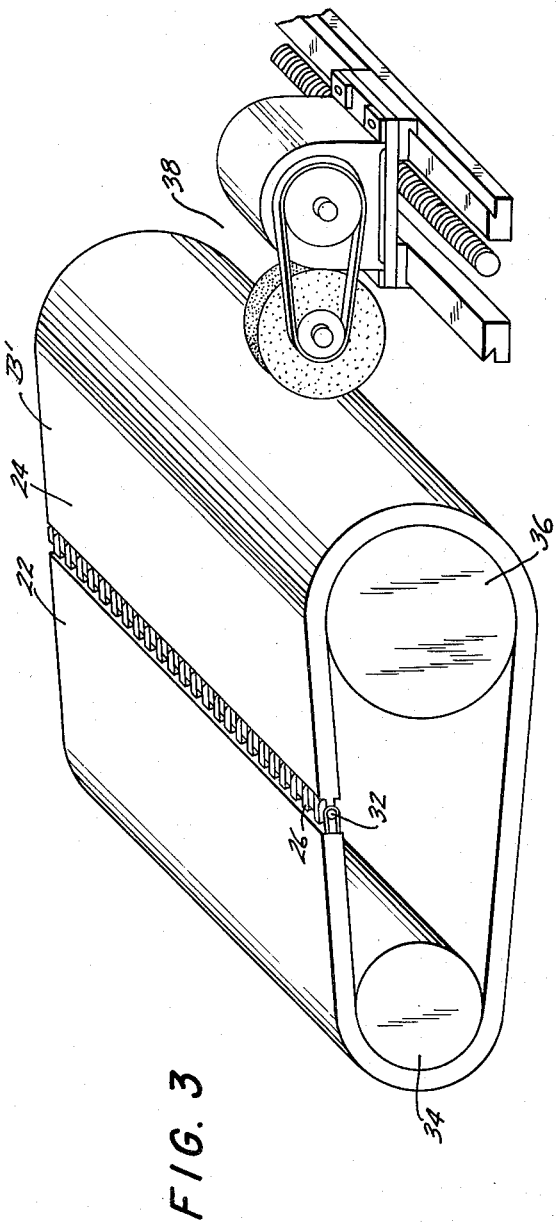
FIG. 3 is a perspective view of an operation depicting a subsequent step of the method.
Figure 4:
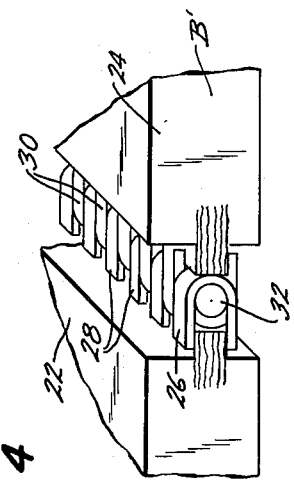
FIG. 4 is a view on an enlarged scale of a portion of FIG. 3.

For making a finished flat belt, the vulcanized belt is first made into an endless formation by uniting the ends of the belt in a manner indicated in FIG. 4 of the drawings. The belt, now designated as B′, has its ends 22 and 24 united by a separable fastener means 26. This is done by stepping back both ends of the belt, removing the top and bottom cover sections of the belt for about 2 inches, and attaching fastener elements 28 to the exposed part of the belt end 22 and fastener elements 30 to the exposed part of the belt end 24, these fastener elements being secured together by means of the fastening pin 32. The purpose of stepping down the ends of the belt is to sink the fasteners below the outside surfaces of the belt for the grinding operation next to be practiced. This endless belt B′ is then mounted on a pair of rolls 34 and 36 as shown in FIG. 3; and the outside surface of the belt (the back surface) is then ground against one of these rolls such as the roll 36, using an abrasive sander wheel apparatus 38. It will be understood that as the belt B′ is rotated around the rolls 34 and 36 and the sander apparatus 38 operated, the surface of the entire belt is abraided to a smooth finish. The pin 32 is then pulled out from the fastening device 26, the belt turned inside out, again re-assembled into an endless formation, and the face of the belt is then ground to a finish or smooth form in a similar manner.

For the making of an endless belt (instead of a flat belt) in finished form, the following steps are sequentially followed: the ends of the belt are secured together by the separable fastener means 26 and the back face of the belt is ground to a smooth finish by the apparatus shown in FIG. 3 of the drawings, all in the manner just described. After this the separable fastener means 26 is excised or removed, the belt turned over and the ends 22 and 24 of the belt are spliced in a conventional manner. After splicing, the belt B′ is attached to a curing frame, well known in the art, and the spliced ends are vulcanized with an electric or steam heated vulcanizer. In so doing, the first heat of the vulcanizer is taken in the center of the belt, the second heat near one edge, the third heat near the other edge, then back to a heat in-between the center and these previous heats on each side of the center, and finally with heats in the in-between positions. Curing the splice in this manner prevents slippage or distortion of the stepped plies in the splice and insures a belt with a uniform length, without a baggy center, or one edge longer than the other. It is highly important in the tracking of a belt of this size to have a product that is as uniform as possible in length across the entire width. Then after thus vulcanizing the belt splice, the belt is again placed on two mandrels or rolls such as those shown in FIG. 3 of the drawings, and the belt is ground on the outside to the finished thickness and smoothness required. Where a belt is desired to be crowned or made thicker in the middle than on the edges, this can be produced by a suitable crowning operation during this final face grind.

After the grinding operation, the belt is removed, packed and boxed. To protect the belt from damage, large paper or metal tubes are inserted in the loops of the belt so that the belt can be boxed without creasing, a method commonly used in shipping endless belts.

The method of making extra-large size belts embodying the principles of the present invention will be apparent from the above detailed description thereof. The advantages of the method in producing belts of extreme lengths and widths will also be apparent. With the use of this method, standard or conventionally sized mandrels and vulcanizers may be employed for the making of extra-large belts of large widths and commensurate thickness. Compared to prior known methods, the method of the present invention enables the employment of much smaller equipment, which can be easily handled, with lighter cranes, thus eliminating the necessity of purchasing and installing extremely large vulcanizers with consequent loss of space, steam, hot water, etc. The method also enables simpler handling and stripping methods, with a saving in labor and capital expenditures over those that would be used in producing large-sized belts in a conventional manner.

While I have shown the practice of my method in a preferred way, it will be obvious that many changes may be made therein and in the apparatus employed in the practice thereof without departing from the spirit of the invention defined in the following claims.

I claim:

1. The method of making extra-large sized rubber belts which comprises first building up a belt carcass of large length and width and of commensurate thickness, said belt carcass having a leading end and a trailing end, winding the belt carcass over its full length about a mandrel producing a convolute winding having a plurality of convolutions, beginning the convolute winding with a ramp part which rises to the height of the belt thickness at the leading end of the belt carcass and ending the convolute winding with a ramp part which trails down from the height of the belt thickness at the trailing end of the belt carcass, said ramp parts functioning to inhibit any distortion from occurring in the subsequent step of vulcanizing, then vulcanizing the convolute-wound belt carcass, then unwinding the vulcanized belt carcass from the mandrel and finishing the vulcanized belt carcass.

2. The method of claim 1 in which the finishing of the belt carcass comprises the steps of fastening the leading and trailing ends thereof together by a separable fastening means producing an endless belt, grinding the outer surface of the belt carcass of said endless belt to smoothness, unfastening the belt, reversing the belt and fastening the belt ends by way of said separable fastening means again producing an endless belt, and grinding the other surface of the belt carcass of said last mentioned endless belt to smoothness and to belt size.

3. The method of making extra-large sized rubber belts which comprises first building up a belt carcass of large length and width and of commensurate thickness, said belt carcass having a leading end and a trailing end, winding the belt carcass over its full length about a mandrel producing a convolute winding having a plurality of convolutions, beginning the convolute winding with a ramp part which rises to the height of the belt thickness at the leading end of the belt carcass and ending the convolute winding with a ramp part which trails down from the height of the belt thickness at the trailing end of the belt carcass, said ramp parts functioning to inhibit any distortion from occurring in the subsequent step of vulcanizing, interposing between the said convolutions a material to prevent the convolutions of the convolute winding from sticking together, enveloping the convlute-wound belt carcass with a pressure-wrap, then vulcanizing the convolute-wound pressure-wrapped belt carcass, then unwinding the vulcanized belt carcass from the mandrel and finishing the vulcanized belt carcass.

4. The method of claim 3 in which the finishing of the belt carcass comprises the steps of fastening the leading and trailing belt ends thereof together by a separable fastening means producing an endless belt, grinding one surface of the belt carcass of said endless belt to smoothness, thereafter removing the fastening means, turning over the belt, splicing the belt ends and grinding the opposite surface of the spliced belt to smoothness and to belt size.

References Cited in the file of this patent

UNITED STATES PATENTS

| | | |
|---|---|---|
| 1,157,844 | Carroll | Oct. 26, 1915 |
| 1,237,554 | Price | Aug. 21, 1917 |
| 1,549,961 | Buckbee | Aug. 18, 1925 |
| 1,679,575 | Kimball | Aug. 7, 1928 |
| 2,322,967 | Perry | June 29, 1943 |
| 2,336,754 | Schelhammer et al. | Dec. 14, 1943 |
| 2,356,249 | Kremer et al. | Aug. 22, 1944 |
| 2,468,898 | Shingle | May 3, 1949 |
| 2,588,647 | Mitchell | Mar. 11, 1952 |
| 2,696,865 | Seiler | Dec. 14, 1954 |
| 2,783,818 | Kenney et al. | Mar. 7, 1957 |
| 2,800,162 | Rohdin | July 23, 1957 |
| 2,960,561 | Plummer | Nov. 15, 1960 |
| 2,965,923 | Smith et al. | Dec. 27, 1960 |